US012724215B2

(12) United States Patent
Griffin

(10) Patent No.: US 12,724,215 B2
(45) Date of Patent: Sep. 1, 2026

(54) OPTICAL FIBER TERMINATION, RELATED DEVICES, AND FABRICATION OF SAME

(71) Applicant: Cyclone Biosciences, LLC, Phoenix, AZ (US)

(72) Inventor: Stephen E. Griffin, Peoria, AZ (US)

(73) Assignee: Cyclone Biosciences, LLC, Phoenix, AZ (US)

( * ) Notice: Subject to any disclaimer, the term of this patent is extended or adjusted under 35 U.S.C. 154(b) by 236 days.

(21) Appl. No.: 18/597,558

(22) Filed: Mar. 6, 2024

(65) Prior Publication Data

US 2024/0310592 A1 Sep. 19, 2024

Related U.S. Application Data

(60) Provisional application No. 63/451,873, filed on Mar. 13, 2023.

(51) Int. Cl.
*G02B 6/42* (2006.01)

(52) U.S. Cl.
CPC .................................. *G02B 6/4292* (2013.01)

(58) Field of Classification Search
CPC .................................................... G02B 6/3867
See application file for complete search history.

(56) References Cited

U.S. PATENT DOCUMENTS 4,788,913 A 12/1988 Stroud et al.
7,051,655 B1 5/2006 Moulard et al.
9,122,009 B1 * 9/2015 Griffin ................. G02B 6/3813
11,575,239 B2 * 2/2023 Kokki ............... H01S 3/094007
12,379,542 B2 * 8/2025 Theeg ................ G02B 6/02309
2006/0188213 A1 * 8/2006 Griffin ................. G02B 6/3835 385/139
2006/0282068 A1 * 12/2006 Griffin ................... A61B 18/20 606/15
2014/0178013 A1 * 6/2014 Nielson ................ G02B 6/3861 385/83
2016/0178844 A1 * 6/2016 Griffin ..................... G02B 6/32 385/33
2018/0222005 A1 * 8/2018 Griffin .................. B24B 19/226

OTHER PUBLICATIONS

Bowden et al., Characterization of Novel Optical Fibers for Use in Laser Detonators, Optical Technologies for Arming, Safing, Fuzing, and Firing II, Proceedings of SPIE, 2006, 6287:628701, pp. 1-14.

* cited by examiner

*Primary Examiner* — Jerry Rahll
(74) *Attorney, Agent, or Firm* — Quarles & Brady LLP; Yakov S. Sidorin

(57) ABSTRACT

A process of formation of an optical fiber termination includes intentionally introducing gas vent gaps within the optical fiber termination, as a result of which fabrication process related mechanical stresses in the termination are greatly or at least substantially reduced. Optical fiber terminations formed with such process. Methodologies of using such optical fiber terminations.

24 Claims, 7 Drawing Sheets

FIG. 1A
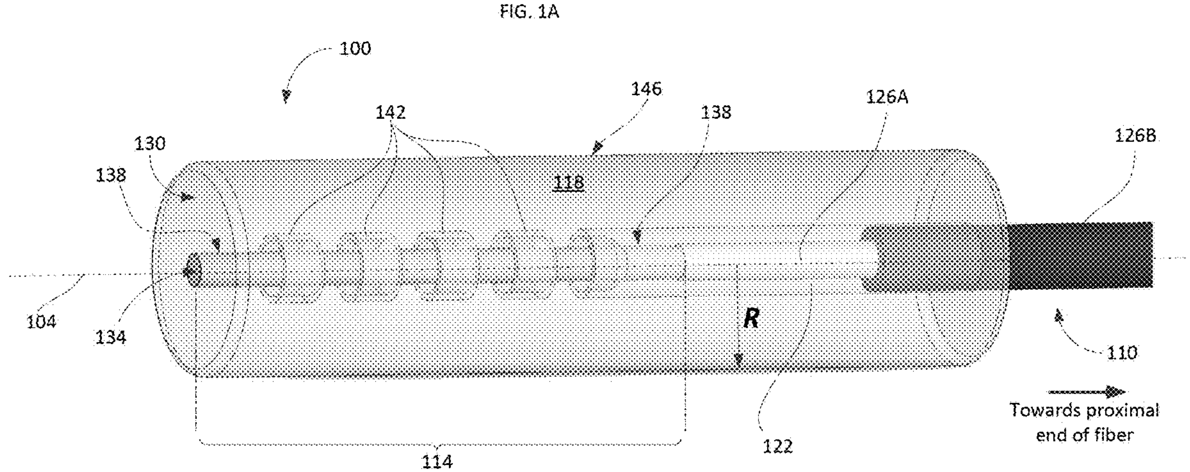
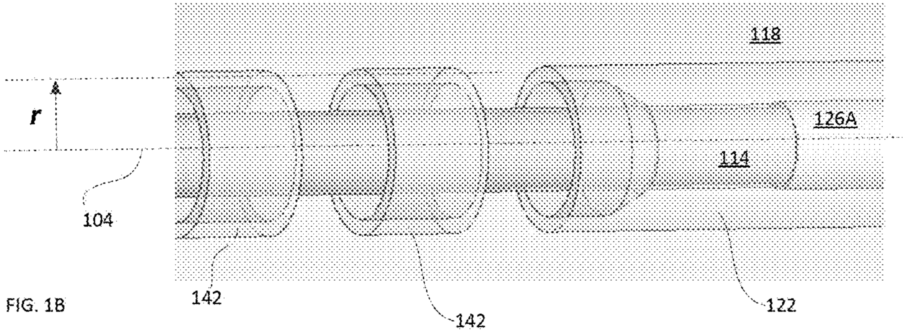
FIG. 1B

118

A
A
110
142
118
122
126B
114
118
110

142
122
114
110

142
118
SECTION A-A 110
114
Step 301: Strip Fiber

Step 305: Slip On Quartz Sleeve
310
+

320
Step 317: Fuse Sleeve On Fiber 340
330
Step 325: Laser Turn OD WRT Fiber Core Step 351: Add Tight Tolerance Sleeve and Fuse

356

330
340
310
114
126A

A
A

SECTION A-A

From FIG. 4A
Steps 351, 551

100
146
142
138
126A
126B
130
118
556
R
134
110
114
122
560

118
568
564

630
640
310
640
114
126A

Fiber Core
Fiber Cladding
640

A
A
114

640
640
126B
630
SECTION A-A 700
718
126B
756

700

A
A
114
700
110
640

700
756
SECTION A-A

OPTICAL FIBER TERMINATION, RELATED DEVICES, AND FABRICATION OF SAME

CROSS-REFERENCE TO RELATED APPLICATIONS

This US Patent application claims priority from and benefit of the U.S. Provisional Patent Application No. 63/451,873 filed on Mar. 13, 2023, the disclosure of which is incorporated by reference herein.

TECHNICAL FIELD

The present invention relates to optical fiber terminations (OFTs) and, more particularly, to optical fiber terminations that offer substantially physically flat (planar) and defect-free surface of an output facet and that are materially and geometrically compatible with processes of deposition of materials thereon performed in a vacuum deposition chamber.

RELATED ART

Bare (free of polymeric jackets or coatings) optical fibers—and, in particular, output facets of such optical fibers and/or OFTs-do not lend themselves to being coated with a layer of predetermined material (in one case—a metal), let alone with a layer of substantially uniform thickness, due to edge effects and the highly variable results produced by mechanical polishing of such facets. Bare fibers very often are not employed by themselves and may require the support of ceramic ferrules, glued about their circumference, for physical support needed to accomplish polishing, handling and integration—in combination with which they form optical fiber terminations. However, processing a (geometrically larger than the optical fiber) optical fiber termination does not address the problem as mechanical polishing is simply inducing smaller and smaller defects to the glass surface, often with difficult-to-detect subsurface damage and residual stresses that are not present in surfaces that are laser polished surfaces. The use of contraptions that include the optical fiber termination—and not just the optical fiber itself—further complicates the chemical and geometric variations in coatings vacuum chamber placement and operation.

SUMMARY OF THE INVENTION

Embodiments of the invention provide an article of manufacture that includes an optical fiber element (an optical fiber) having a first outer diameter, and an optical fiber termination dimensioned as a substantially cylindrical tube of a glass-based and/or ceramic material that has a second outer diameter and that contains voids. The voids are distributed throughout a body of the tube along an internal substantially cylindrical surface having a third diameter that is smaller than the second outer diameter. The outer surface of the optical fiber element is a surface of glass and, at a distal end thereof, is permanently and directly affixed to an inner surface of the optical fiber termination. Optionally, either (i) the optical fiber element includes an optical fiber core, an optical fiber cladding (here, the optical fiber cladding has a first inner diameter, the first outer diameter), and the outer surface of the optical fiber element; or (ii) the inner surface of the optical fiber termination has a second inner diameter and the third diameter is larger than the second inner diameter; or (iii) both. Alternatively or in addition, and substantially in every implementation of the article, the inner surface of the optical fiber termination may be hermetically joined with the outer surface of the optical fiber element at the distal end along multiple circumferentially closed lines distributed along an axis of the optical fiber element; and/or the voids do not contain (that is, are devoid of) the glass-based material of the optical fiber termination. Optionally, in every embodiment of the article, the optical fiber termination may include a hollow with a substantially cylindrical inner surface that is substantially co-axial with the internal substantially cylindrical surface and that is not in contact with the outer surface of the optical fiber element (alternatively or in addition, in at least one specific case, the optical fiber element may include a fiber buffer, and a portion of the fiber buffer is located inside the hollow). Alternatively or in addition, at least one of the voids may be dimensioned to define a spiral pattern along a length of the optical termination or wherein said least one of the voids defines a substantially cylindrical void or a void shaped as an O-ring, and/or a distal facet of the optical fiber element and a distal facet of the optical fiber termination may be disposed and polished in a plane to define a distal facet of the article of manufacture. (A distal facet of the optical fiber element and a distal facet of the optical fiber termination may be structured to aggregately define a substantially planar distal facet of the article of manufacture.) An embodiment of the article may additionally include a coating of a pre-determined material deposited on the distal facet of the article of manufacture (here, in one specific case, the first outer diameter and the second outer diameter are dimensioned such that such coating of the pre-determined material is necessarily substantially uniform across a distal facet of the optical fiber element, and/or such coating of the pre-determined material may include metal). In at least one specific case of the latter, the embodiment may contain an endpiece including a housing having a volume (such endpiece may be configured to be axially aligned with the optical fiber termination such as to have the volume separated from the distal facet of the optical fiber element by said coating of the pre-determined material.

Embodiments of the invention additionally include a method includes a process of fabricating the article of manufacture (that is structured according to any of the embodiments identified above). The process of fabricating includes a step of permanently joining a bare glass-based material outer surface of a distal end of an optical fiber element (where such fiber element has an axis and where the bare glass-based material outer surface has a fiber outer radius) with a first inner surface of a hollow of a first element of an optical fiber termination, said first element having a first length. The process of fabricating also includes a step of hermetically fusing (between a first plane and a second plane) a first outer surface of the first element of the optical termination with a second inner surface of a second element of the optical fiber termination such as to not have gas trapped between the first outer surface and the second inner surface (that is, without trapping the has between these two surfaces). Here, the first plane and the second plane are separated from one another along the first length, and the outer surface of the first element of the optical termination is a surface of a material dimensioned as a cylindrical surface having substantially constant first radius along the first length. (Optionally, the first outer surface may be the surface of a glass-based and/or ceramic material, and/or the second element of the optical fiber termination may be dimensioned as a tubular element having a hollow with a substantially constant second radius; and/or the method additionally includes a step of dimensioning the first outer surface of the first element of the optical termination to be such cylindrical surface of the substantially constant first radius. (When the latter condition is satisfied, the method may be configured such that the (1) step of dimensioning includes defining the first radius to be smaller than the second radius by no more than 10 microns and/or no more than 5 microns and/or no more than 2 microns and/or no more than 1 micron; and/or (2) an axial separation between the first and second planes exceeds 2 mm and/or exceeds 5 mm and/or exceeds 10 mm. Alternatively or in addition, in substantially every implementation, the method may additionally include a step of forming (in the first outer surface and between the first plane and the second plane) multiple grooves and/or notches the bottoms of which are defined at at least one third radius that is smaller than the first radius. When the step of forming is taken, at least one of the following conditions may be satisfied: (a) at least one of the multiple grooves and/or notches substantially circumscribes the axis; (b) a groove and/or notch of the multiple grooves and/or notches is shaped as an annular ring; and (c) the step of hermetically fusing includes fluidly isolating sealing the multiple grooves and/or notches from an ambient medium surrounding the second element of the optical fiber termination. Optionally, in at least one implementation, the step of hermetically fusing may include repositioning a beam of laser light (while interacting such light with at least one of the first outer surface and the second inner surface) along the axis; and/or the step of permanently joining may be structured to not include the use of a glue or adhesive; and/or the step of permanently joining may be configured to include fusing the bare glass-based material outer surface and the first inner surface substantially at every point of the first inner surface.

Embodiments of the invention additionally provide a method that includes permanently joining a bare glass-based material outer surface of a distal end of an optical fiber element with a first inner surface of a hollow of a first element of an optical fiber termination (here, the first element has a first length, the bare glass-based material outer surface has a fiber outer radius, and the optical fiber element has an axis). The method also includes a step of hermetically fusing (between a first plane and a second plane) a first outer surface of the first element of the optical termination with a second inner surface of a second element of the optical fiber termination such as to not have gas trapped between the first outer surface and the second inner surface.

Embodiments of the invention further provide a method that includes propagating light from a proximal end of an optical fiber element towards a distal bare end thereof that has a first outer diameter and that carries an optical fiber termination thereon. (Here, the optical fiber termination is dimensioned as a substantially cylindrical tube of a glass-based and/or ceramic material that has a second outer diameter and that contains cavities; and the cavities are distributed throughout a body of the tube along an internal substantially cylindrical surface with a third diameter that is smaller than the second outer diameter. An outer surface of the distal bare end is permanently and directly affixed to an inner surface of the optical fiber termination.) The method additionally includes a step of transmitting the light through an output facet of the distal bare end.

BRIEF DESCRIPTION OF THE DRAWINGS

The invention will be more fully understood by referring to the following Detailed Description of Specific Embodiments in conjunction with the Drawings, of which:

FIGS. 1A, 1B provide schematic illustrations of an embodiment of the invention.

Here, FIG. 5A schematically illustrates a portion of the embodiment of FIG. 1A in which a distal facet of the optical fiber element and a distal facet of the optical fiber termination aggregately define a substantially planar distal facet. FIG. 5B schematically illustrates the portion of FIG. 5A with a coating of a pre-determined material deposited on the substantially planar distal facet such that such coating is necessarily substantially uniform across a distal facet of the optical fiber element.

Figures 2A, 2B, 2C:
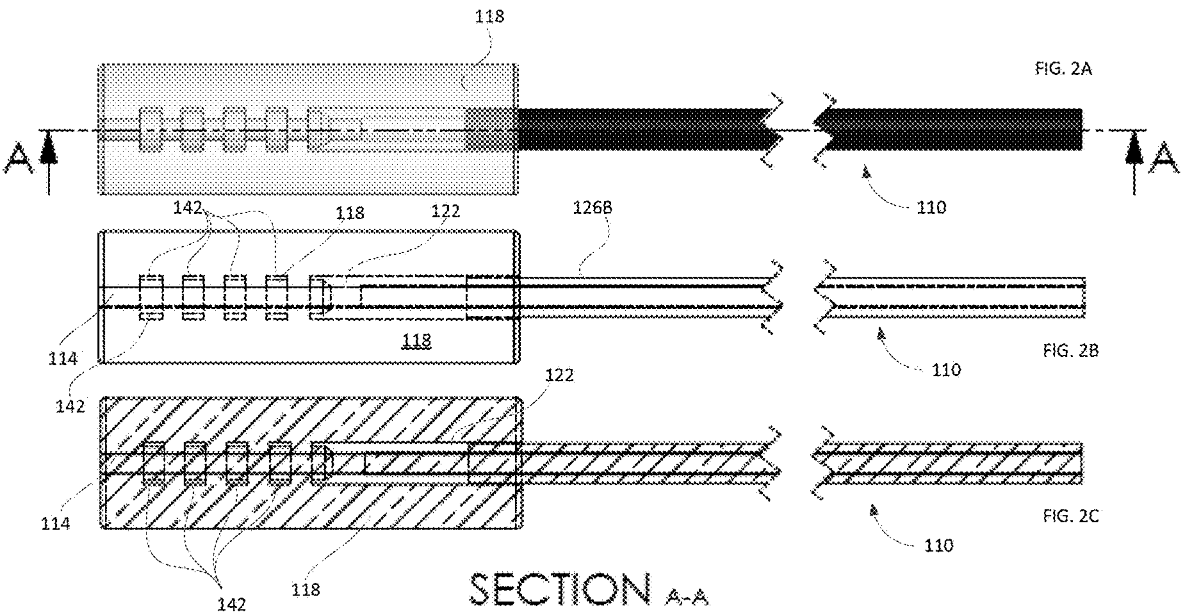
FIGS. 2A, 2B, and 2C provide additional illustrations of the embodiment of FIGS. 1A, 1B.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another. Specific embodiments are depicted in the figures with the understanding that the disclosure is intended to be illustrative and are not intended to limit the scope of invention the implementations of which are described and illustrated herein.

DETAILED DESCRIPTION

In accordance with the idea of the invention, this application discloses and discusses embodiments of optical fiber terminations (OFTs, which interchangeably may be referred herein as fiber optic terminations or simply fiber terminations). Every one of the discussed embodiments is structured to be necessarily compatible with reproducible and high-volume manufacturing where the dimensional precision and accuracy of material coating(s) (in particular-metallic foil(s)) applied to the output facet of an optical fiber secured in such OFT) and the nature of interaction of such material coating(s) with a pulse of laser light propagating through this optical fiber towards the output facet of such fiber (secured in an OFT) are sufficient to permit statistical sampling for quality assurance. In particular, disclosed are embodiments of OFTs that offer physically flat and defect-free output facet(s)/surface(s) that are substantially chemically identical with one another and compatible with vacuum-deposition-chamber-based additions of metallic foils in uniform thicknesses, as well as related methods for manufacturing and systems and optical-fiber-based devices employing such OFTs (in one example, structures known as fiber-optic based detonators or optical detonators including an optical fiber).

One of the used in related art processes of forming a termination of a free bare distal end of an optical fiber includes fusing a hollow material cylinder onto such distal end, thereby increasing a radial dimension of the resulting structure as compared with that of the constituent optical fiber itself. A well-recognized in the art deficiency of such process (particularly distinctly manifesting itself when the two cylinders—the solid body of the distal end of the optical fiber and the hollow material cylinder—are dimensioned to tightly fit and/or match with one another) is caused by gas/air that becomes trapped between the facing-each-other walls of the constituent cylinders as such cylinders are being fused, leaving "gaps" or "voids" between the surfaces that harbor immense stresses. These areas of failure-to-fuse present themselves as reflecting areas (local "mirrors") and often exhibit coloration due to (thin-film) optical interference of light when observed from outside.

One possible explanation of this effect may be that-due to the finite non-zero size of the laser light spot that effectuates the fusion, as the repositionable spot of the laser light approaches the location of deviations/variances in one or more of the cylindrical surfaces (that serve as nanoscale pockets between the surfaces being fused)—the spot of laser light causes fusion not only at the location of the center of the spot but also ahead of the general fusion front, thereby effectively closing off an escape route to the rapidly expanding atmosphere. It is a ubiquitous phenomenon where a hollow cylinder of a glass material is fused over a closely dimensionally fitting glass rod (where the differences in the other diameter of the latter and the inner diameter of the former are about 2 to 10 micrometers or so, and where one seeks total fusion over a length equal to or exceeding, for example, 2 mm. When the difference between the corresponding dimensions of the cylinders being fused is above 10 microns (that is, when the cylinders are not tightly fitting to one another) and the fusion length exceeds, for example, 5 mm or so, the problematic "gap(s)" between the surfaces may not necessarily extend over the whole length of the fused region, but instead occur discretely and somewhat regularly. These "gaps" or "voids" between the corresponding and otherwise fused together surfaces are now wider and distort the cylindrical dimensions more than the gaps formed during the fusion of the tightly fitting cylinders. The skilled artisan will readily understand that, in the process of glass joining, the lower the angle of contact between two elements (that are being fused together), the greater the concentration of stresses. In addition to dimensional variations due to the interruptions in fusion, the submicron thickness voids or gaps (often spanning millimeters of length) will almost necessarily initiate fracture spontaneously given time or under added stress, thereby leading to detrimental changes in the resulting structure.

Embodiments of the present invention solve the above-described problem persisting in related art. Specifically, embodiments solve a problem of trapping gas (in a specific case—air) between structural layers of an optical fiber termination (formed with the use of fusing of constituent materials and, in particular, with the use of fusing nested cylinders of materials that are dimensioned to be tightly fitting and/or matched to one another to achieve high level of centricity and low ovality of the resulting optical fiber termination), which causes undesired gaps representing failure of the materials to fuse and harboring immense stresses detrimental to the structural integrity of the optical termination and leading to at least fractures or even destruction of the optical fiber termination when mechanical pressure is applied thereto during the operation. The solution is achieved by not only configuring the constituent materials to reduce variances of difference(s) in corresponding dimensions thereof (to remove pre-existing dimension-dependent gaps between the matching surfaces of the constituent materials) but also by deliberately generating gas-relief structural features configured to provide an escape route to the rapidly expanding gases contained in and/or at the optical fiber termination materials and fluidly sealed within a resulting body of the optical fiber termination. (A person of skill in the art will readily appreciate that, in the alternative, the same problem may be solved by intentionally fusing nested cylinders of material a dimensional difference between which is made substantially large such as to permit gas to escape from the gap between the outer diameter of the inner cylinder and the inner diameter of the outer cylinder during the process of fusing. It is understood, however, that when the nested cylinders that are not tightly fitting and/or dimensionally matched to one another are being fused, the overall process of fabrication of the optical fiber termination is simplified at the expense of producing the resulting contraption in which the outer diameter of the outer cylinder (that is, its outer surface) is not necessarily co-axial with the inner cylinder to a degree that may be required for proper operation of the optical fiber termination.)

In particular, it was unexpectedly discovered that the above-described fusion gaps or voids can be avoided substantially entirely if the dimensional (diameter-wise) difference between the corresponding surfaces of the cylinders being fused generally does not exceed about 30 microns for short fusion lengths (under 10 mm or so) and does not exceed about 60 microns for longer fusion lengths. Only the difference in the corresponding diameters matters; the diameters themselves can be sub-millimeter to multiple millimeters to even a centimeter. Further, it was discovered that providing periodic, purposefully large dimensional differences between the inner diameter of the outer cylinder and the outer surface of the inner cylinder (of the two nested cylinders that are being fused together) every once in a while (for example, one per millimeter of the length being fused) facilitates and enables the successful process of fusion of the very tightly fitting cylinders with only the low stress (90-degree joints) voids that may still result-if any.

The scope of the invention takes advantage of both of these discoveries. According to implementation of one idea of the invention, for example, loose fitting fusion is used to provide the initial cylinder added, as a cylindrical sleeve, on top of the bare optical fiber, accepting the eccentricity and ovality that result because the construct is then laser turned with reference to the fiber cladding (chucked on the bare fiber section) to concentric and round cross-section, with the periodic air vent voids also provided. The large outer diameter (OD) of the so-sleeved fiber is then matched closely to the inner diameter (ID) of the second outer cylindrical sleeve, which is drawn to very accurately and and precisely for a highly concentric and minimally oval final structure, suitable for termination in a vacuum compatible fiber-optic connector for subsequent deposition of a chosen material (for example, thin metal film deposition) across the entire laser finished output facet (face) of the final structure.

Generally, as used herein and unless expressly defined otherwise, the term fiber buffer denotes and refers to a material that is used to protect an optical fiber from physical damage and that may include any of a tight jacket layer (of protective outer coating typically made of nonmetallic materials such as PVC, PVDF, ETFE, fluoroacrylate, polypropylene, to name just a few) and loose tube buffering, as well as multiple buffer layers, as known in related art. The term cylinder refers to and defines a solid or hollow body, object, or part having a cylindrical structure as understood in related art.

A typical implementation of the idea of the invention results in an article of manufacture that contains an optical fiber element equipped with an optical fiber termination, OFT, which is disposed to effectively house a bear distal end of such optical fiber element such that the outer surface of the bear distal end is directly affixed to an inner surface of the OFT. The OFT is dimensioned as a substantially cylindrical tube of a glass-based and/or ceramic material that has an inner surface of a corresponding inner diameter and an outer surface of a corresponding outer diameter and that contains voids. Such voids or cavities in the material of the OFT are distributed throughout a body of the tube along a substantially cylindrical surface with a diameter that is smaller than the outer diameter of the OFT.

FIGS. 1A, 1B present perspective views of an example 100 of such article of manufacture having an axis 104. Here, the optical fiber 110 is shown with a bare distal end 114 having an outer glass surface and disposed within the OFT 118. The hollow 122 of the OFT 118 optionally may—and in this specific example does-house a portion of the fiber 110 that optionally carries is covered with a fiber buffer or jacket or protective layer(s) 126A, 126B. The output facet (or, the distal surface) 130 of the OTF at the distal end of the OTF is shown to be substantially co-planar with the output facet 134 of the optical fiber 110—that is, the fiber output facet 134 and the distal surface 130 of the OFT 118 aggregately define and/or form a substantially planar distal facet of the contraption 100. The proximal end of the OFT 118 is shown to be positioned over the buffer 126B. Along a substantial portion of the axial extent of the bare distal end 114, the OFT 118 is fused with the outer surface 138 of the end 114. In a typical embodiment such as the embodiment 100, the outer surface 138 of the bare distal end of the fiber is the surface of the (glass-material-based) fiber cladding.

The body of the OFT 118 contains the multiplicity (as shown-four) of the voids/cavities/pockets 142 distributed axially along and/or at a substantially cylindrical surface with a radius r that is smaller than the radius R of the outer surface 146 of the OFT 118 (and larger than the radius of the bare distal end 114 of the fiber 110 (compare FIGS. 1A and 1B), as will be discussed in more detail below. In the specific example of the embodiment 100, a void 142 is dimensioned as a substantially cylindrical void (and/or the void substantially having an axial symmetry; one can possibly think of it being shaped similarly to an O-ring). As is illustrated schematically in FIGS. 2A, 2B, 2C, the space between a given void/cavity 142 and the outer surface 138 of the bare end 114 of the optical fiber is filled with the material of the OFT 118, while the volume enclosed by such void/cavity 142 is substantially free of the material of the OTF and is configured to perform as a gas-relief feature during the process of fabrication of the contraption 100 (as will be explained in more detail below), and for that reason may include gascous contents.

Details of the structure of an embodiment of the invention will be better appreciated by considering an example of a process of fabrication of such embodiment in reference to FIGS. 3A, 3B, 3C, 3D, and 3E, 4A, 4B, 4C, and 4D, and 5A, 5B. At the initial step 301 (FIG. 3A), an identified optical fiber (such as, in a non-limiting example, a large silica core—e.g., 365 μm, glass clad—e.g., 400 μm, step index and multimode optical fiber) is laid bare of polymers and other jacket layers by stripping the buffer(s) 126B, 126A (such as ETFE and fluoroacrylate) along the predetermined length of the fiber at the distal end thereof to expose the bare end 114. Thereafter (FIG. 3B), a loosely fitting glass-material (for example, fused quartz or fused silica) relatively thin-walled (e.g., 200 μm) sleeve (cylinder 310; fitting over the distal end loosely to allow the air to escape during the fusion process; for example, having a bore that is about 30 microns to 60 microns larger than the fiber cladding OD, in our dimensional example) is slipped onto the bare end 114, and is fused over and with the fiber cladding outer surface through laser fusion (at steps 305, 317).

Figures 3A, 3B, 3C, 3D, 3E:
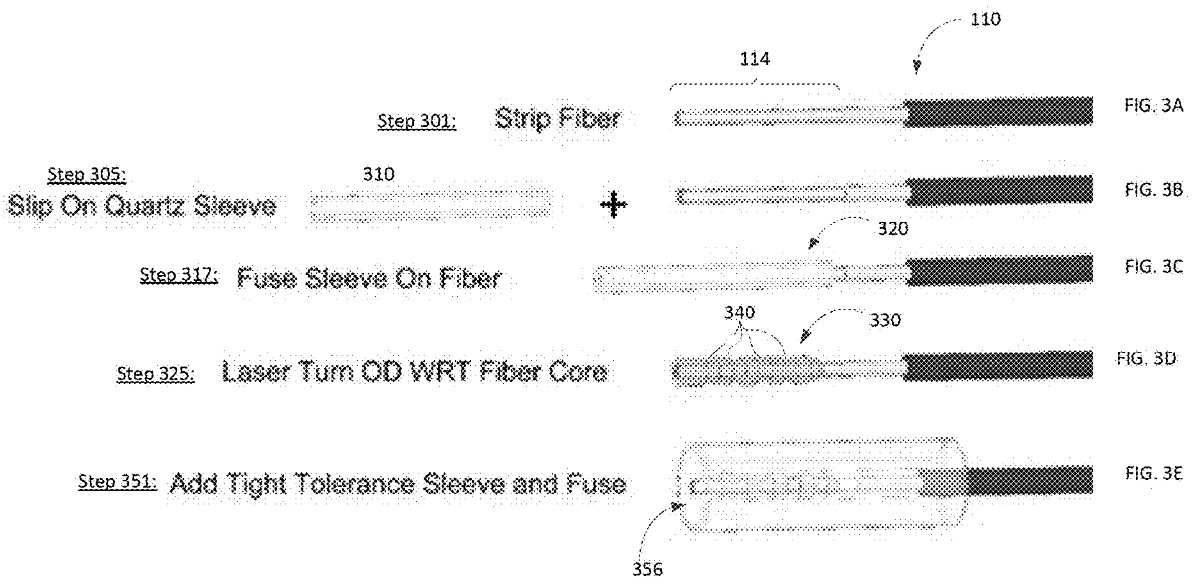
FIGS. 3A, 3B, 3C, 3D, and 3E illustrate a methodology of fabrication of an embodiment of the invention.
Figures 4A, 4B, 4C, 4D:
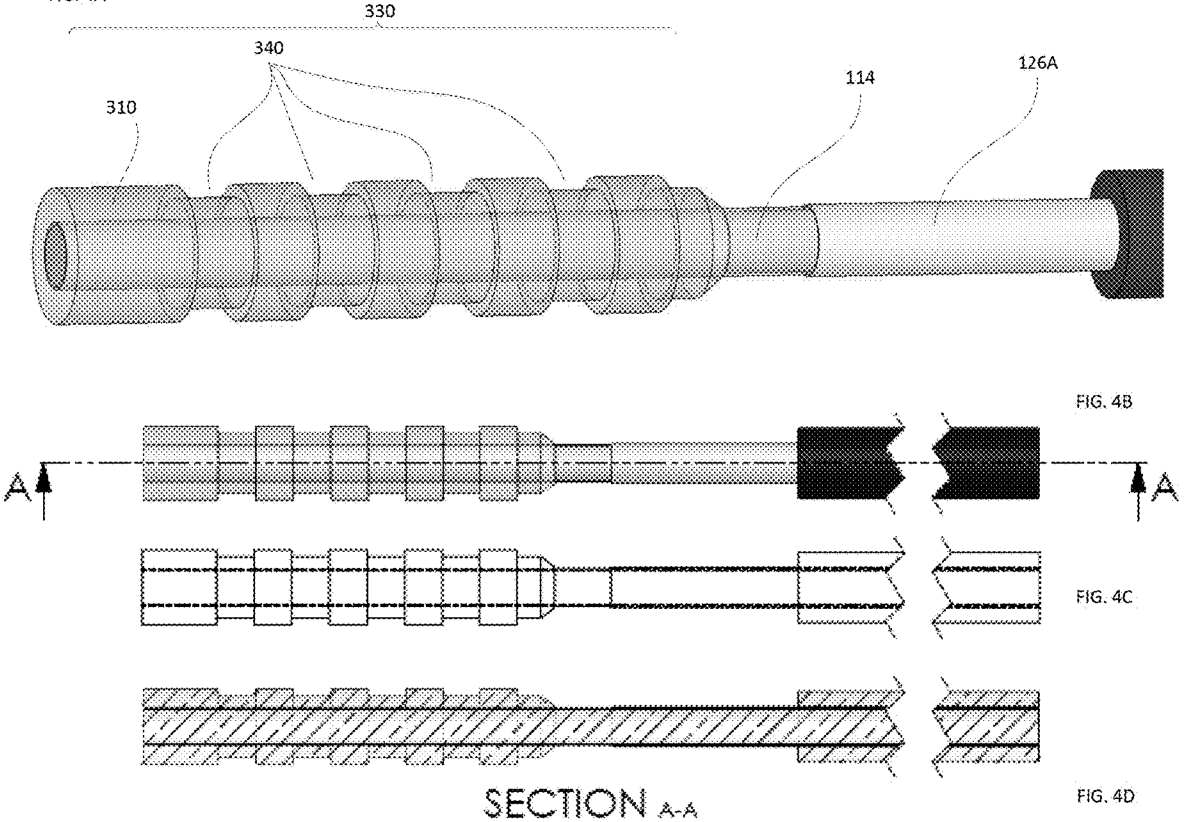
FIGS. 4A, 4B, 4C, and 4D Illustrate a pre-form (an intermediate construct) formed in the process of fabrication discussed in reference to FIGS. 3A through 3E.

The resulting construct 320 (FIG. 3C) is then laser machined (step 325) with reference to the outer surface 138 of the bare end 114 (for high centricity) while at the same time forming expanding atmospheric gas relief features on the outer diameter of the sleeve 310, to produce the intermediate pre-form 330, FIG. 3D. In one case, this can be implemented with the fiber chucked in the spindle at the fiber cladding. In particular, when fabricating the embodiment 100 of the invention, the laser machining of the outer surface of the sleeve 310 of the construct 320 may be shaped to generate grooves or trenches or troughs 340, each encircling the axis 104 of the fiber 110. The axially-cross-sectional shape of such grooves may be substantially or approximately rectangular with predetermined dimensions in one specific case, or with dimensions that are not predetermined (in which case the cross-sectional shapes of different grooves may be different. The number and axial locations of the grooves 340 may also be optionally predetermined as operationally appropriate. The structural details of the pre-form 330 are schematically shown in different views in FIGS. 4A, 4B, 4C, and 4D.

Figures 5A, 5B:
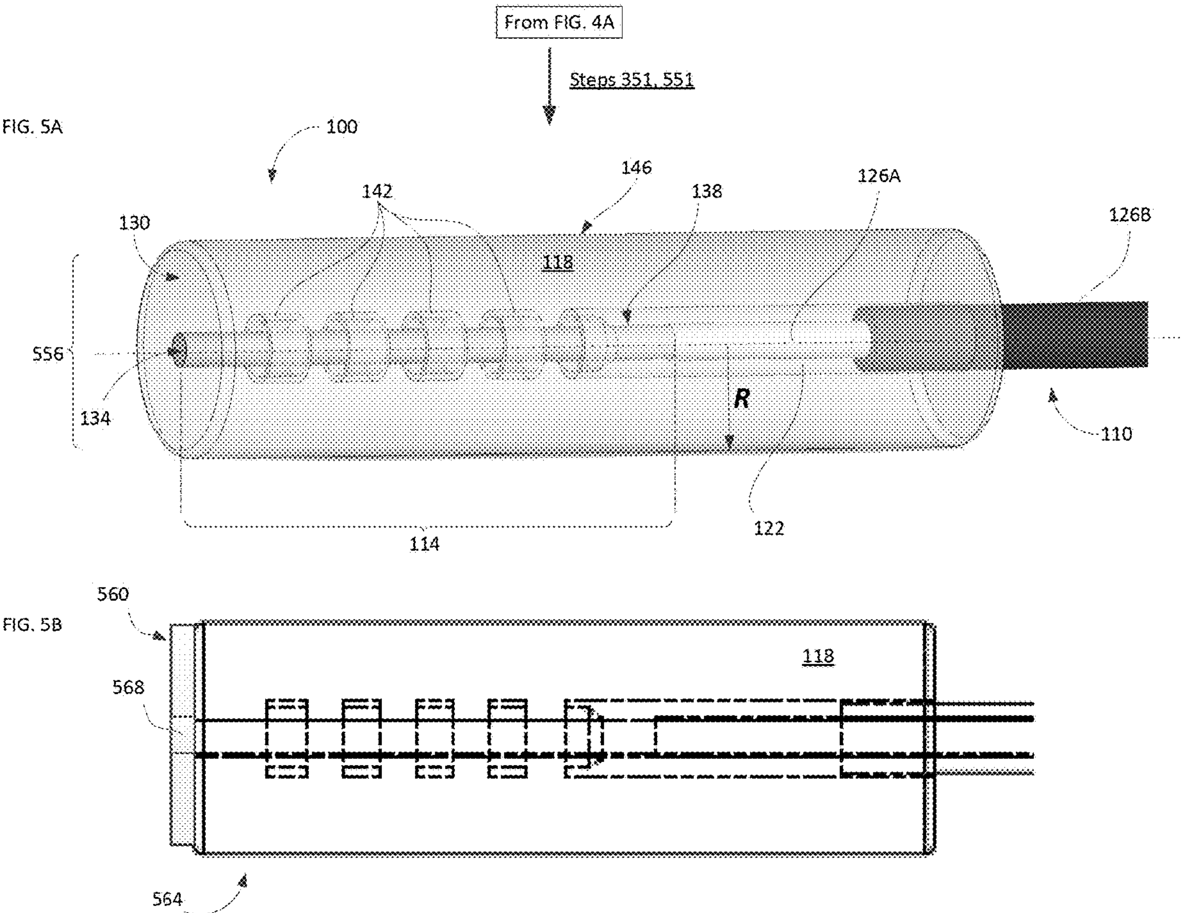
FIGS. 5A and 5B provide additional views of the embodiment of FIGS. 1A, 1B.
Figures 6A, 6B, 6C, 6D:
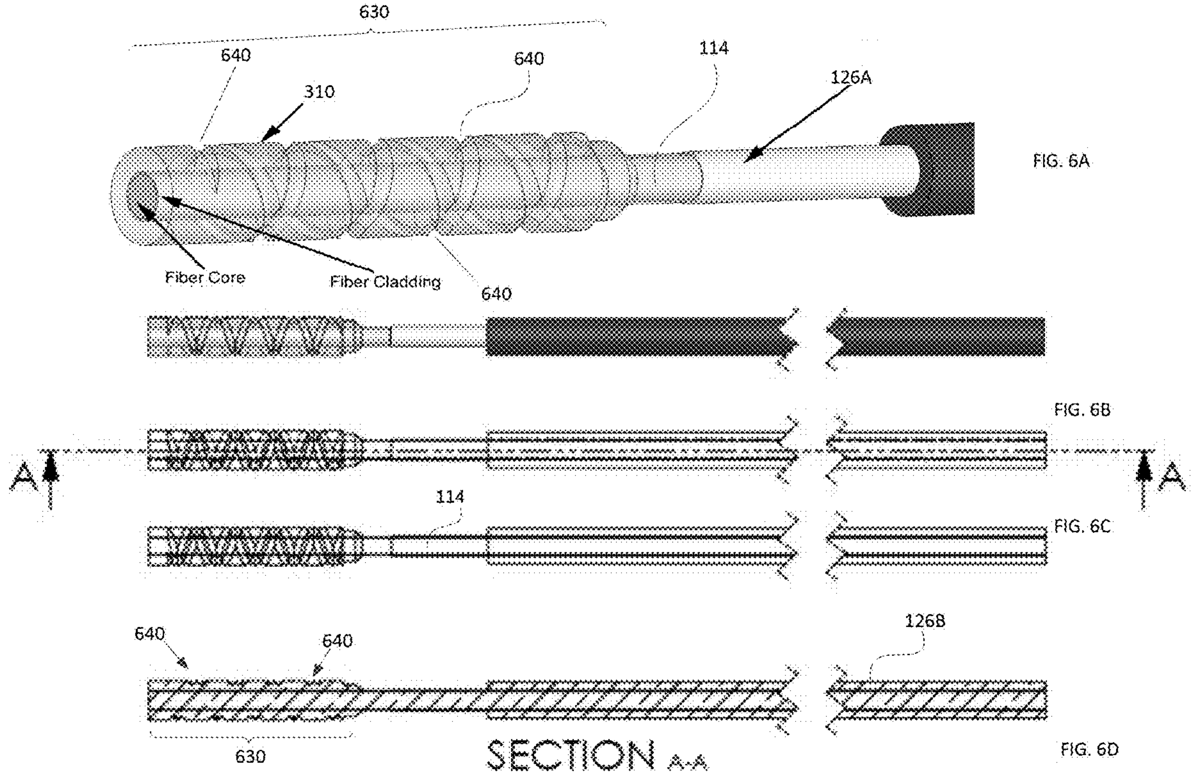
FIGS. 6A, 6B, 6C, and 6D, 7A, 7B, 7C, and 7D are depictions of a related embodiment of the invention and/or a portion of such related embodiment that is formed at an intermediate stage of the process of fabrication.
Figures 7A, 7B, 7C, 7D:
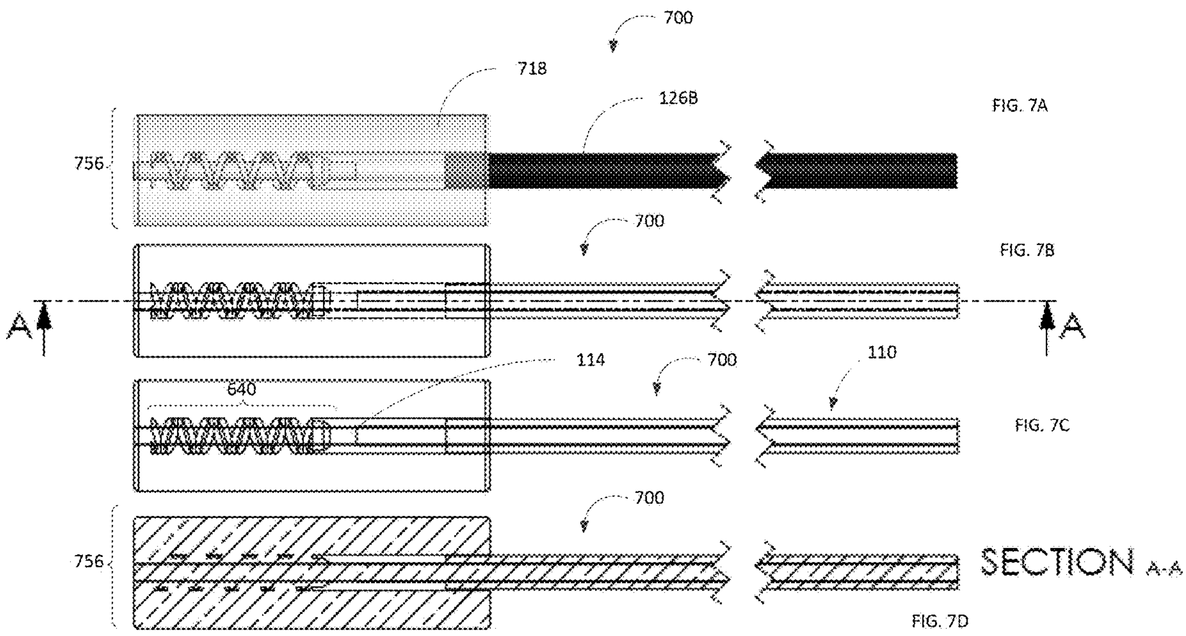

Referring now to FIGS. 3E and 5A, 5B, at the next steps 351, 551 of fabrication of the embodiment of FIGS. 1A, 1B:

- the second (outer) sleeve (with, e.g., 2.5 mm OD, surface 146) that has the internal cylindrical hollow dimensioned to closely match the outer diameter of the inner sleeve 310 (for example, with a difference between 1 μm to 3 μm) is fused on top of the pre-form 330, thereby hermetically enclosing/confining the grooves 340 between the outer sleeve now fused on top of the inner sleeve 310 and forming the OFT 118 with the voids/cavities/pockets 142 containing such grooves. The outer sleeve may optionally be axially dimensioned to extend well beyond the pre-form to encompass a region of the bare end 114 outside of the pre-form 330 and/or the protective polymer element and/or jacket/buffer 126A, 126B of the optical fiber 110;
- following the formation of the OFT 118 that encloses and is fused with the bare distal end 114 of the optical fiber 110, the distal face surface of the overall fused cylindrical construct (that is, the distal face surface of the combination of the bare end 114 and the OFT 118) is then laser polished substantially flat where the laser vaporization of the composite (substantially planar) surface (356, 130+134) is at least centrosymmetric about the fiber axis and/or fiber core and beyond to a minimum twice the fiber core diameter (e.g., 730 μm in this dimensional example).

The distal end of the resulting embodiment (FIG. 1A and/or FIG. 5A) provides a substantially flat, substantially defect-free surface (556, 130+134, 356) that is larger in diameter than the fiber cladding for deposition of "flyer" material (in one specific example—aluminum) in a vacuum chamber onto the laser polished surface 556 to ensure at least circumferential uniformity of vapor-deposited layer of coating 560 of the so formed embodiment 564, FIG. 5B. The adhesion of the "flyer" material 560 to the laser polished surface 556 is reproducible and the distortion-free cladding containment of the fiber core provides a centrosymmetric (substantially circular) line along which a substantially uniform portion 568 of such flyer material coating deposited over the area corresponding the fiber facet 134 can be separated when exposed to a laser pulse delivered through the fiber from the proximal end thereof (for the purposes of forming an optical detonator, for example).

A skilled artisan will readily appreciate that the gas relief features (discussed here as voids or cavities or pockets formed in a body of an embodiment of an OFT during the process of fabrication) may be of various and numerous geometries, but regardless of the geometry such voids/cavities the second (outer) sleeve of the glass material (such as fused quartz or fused silica cylinder, in one specific example) is hermetically joined to the machined inner sleeve already fused on top of the bare end of the optical fiber while the maximum outer dimension of the machined inner sleeve closely matches the inner dimension of the second (outer) sleeve. One non-limiting alternative of shaping the inner sleeve during the process of fabrication of an embodiment of the article of manufacture is schematically illustrated in reference to FIGS. 6A, 6B, 6C, and 6D and 7A, 7B, 7C, and 7D.

Here, in comparison with the fabrication of the embodiment 100, at step 325 of the general fabrication process (see FIG. 3D) the outer surface of the construct 320 is laser machined differently, to generate a pre-form 630 that is dimensioned differently from the preform 330. In particular, as shown in this specific example, laser machining of the outer surface of the inner sleeve 310 can be configured in such a fashion as to form grooves or tranches or troughs 640 that define a spiral pattern along a length of the bare end 114 of the optical fiber 110 (and, therefore, along a length of the sleeve 310). See FIGS. 6A, 6B, 6C, and 6D. As a result, after the remaining steps of the fabrication process are completed, the related embodiment 700 of the article of manufacture is produced—see FIGS. 7A through 7D—in which the optical termination 718 contains voids/cavities shaped as at least portions of a spiral formed along a surface drawn through the body of the OFT 118. As discussed above in reference to FIG. 5B, the substantially planar output facet 756 of the distal end of this related embodiment can also be further processed via the vacuum-chamber deposition process to deposit a coating of material (such as a metal, for example; not shown for simplicity of illustration) that is substantially uniform at least across the area corresponding to the area of the output facet of the optical fiber component of the embodiment.

A skilled person having an advantage of the above disclosure now readily understands that—regardless of how the voids/cavities distributed throughout the body of an OFT are shaped—the process of fabrication of the article of the invention includes at least a combination of a step of permanently joining a bare outer surface of a distal end of an optical fiber element (that has an outer diameter and an axis) with an inner surface of a hollow of a first element of an optical fiber termination with a step of hermetically fusing an outer surface of the first element of the optical termination to an inner surface of a second element of the optical fiber termination such as to not have air trapped between the first outer surface and the second inner surface. (Here, in at least one case, the outer surface of the first element of the optical termination may be dimensioned as a cylindrical surface of a substantially constant second radius.) The process of hermetically fusing may include fluidly sealing grooves and/or notches and/or troughs formed on the outer surface of the first element of the OFT from an ambient medium surrounding the second element of the OFT.

In operation, any embodiment of the article of manufacture structured according to the idea of the invention may be optically cooperated with a source of laser radiation (not shown) at the proximal end of the optical fiber.

A skilled artisan will readily appreciate that the embodiment of the article of manufacture (100, 564, 700) structured according to the idea of the invention and optionally carrying the pre-determined coating (preferably, a layer of a metal) on the substantially planar output distal facet thereof can be further employed as a component of an optical detonator, which component enables a reliable launch of the "flyer" material portion 568 (in reference to FIG. 5B) of the coating into secondary explosive for initiation of the detonation. A particular advantage of forming such component for the purposes of using it in the optical detonator is that it may be tested prior to deposition of the flyer material (coating 560, in the example of FIG. 5B) for exit beam profile and a means of detecting any aberrations that might lead to incomplete separation of the portion 568 in use and, therefore, to frustration of the operation of the optical detonator.

To this end, an optical detonator is known in related art as a detonator of the type comprising secondary explosive disposed in a cavity, an optical fiber connected at its proximal end to a source of laser radiation, and a material layer disposed between the secondary explosive and the output facet of the optical fiber and configured to activate the secondary explosive in response to interaction with a laser radiation delivered to the material layer through the optical fiber. (In a manner that is entirely conventional in the field of explosives, the term "secondary" explosive is used to designate an explosive that is relatively insensitive, in contrast with "initiating" or "primary" explosives, which are very sensitive and thus dangerous. See, for example, U.S. Pat. No. 7,051,655 the disclosure of which is incorporated by reference herein.)

In at least one implementation of the optical detonator with the use of the article of manufacture structured according to the idea of the invention and discussed above, such implementation may include an endpiece including a housing that is mechanically cooperated with an embodiment of the OFT carrying a layer of vacuum-deposited coating on its distal output surface. Such housing may be equipped with a secondary explosive material confined inside the housing, while the endpiece is preferably configured to be axially aligned with the OFT such as to have the explosive material be separated from the distal facet of the optical fiber element by the layer of the coating.

Specifically adapted for the use in an optical detonator, an embodiment of the article of manufacture discussed above may be equipped with O-ring grooves for integration within vacuum compatible connectors or may be plated for solder integration, as long as the portion that must be exposed within the vacuum coating chamber for deposition of the target coating on the output distal facet of the article is composed of 100% non-volatile glass material (in one specific case, fused silica or fused quartz) where the fiber core and cladding extend to the laser-formed flat surface.

In such a case, and in the example when the embodiment 564 is used as part of the optical detonator construction, the transition to detonation conditions may be triggered by the shock wave which is created by the impact of the projectile disk of the coating (the portion 568 of the coating 560) propelled into the housing of the endpiece due to interaction of the pulse of laser radiation delivered to the coating 560 from the laser source optically cooperated with the proximal end of the optical fiber 110.

Additional Considerations. Methodology of fabrication of a component of an embodiment of the article of manufacture that includes an optical fiber cooperated with an OFT, as discussed above, provided visible improvement over the existing methodologies. For example, when a bare optical fiber, glued into zirconia ferrules at 2.5 mm outer diameter (compatible with the deposition chamber fitting) was employed, the mechanical polish of the output distal facet of such construct was found to be practically impossible to reproduce and/or impossible to inspect (subsurface stresses imparted by the polishing process onto the surface of the distal output facet were very difficult to detect until a high energy laser pulse was passed through the fiber, fracturing it and thus evidences the high levels of stress). It was established that glued-in fiber simply does not provide the reliability needed to forgo testing and testing is 100% destructive/damaging near the laser damage threshold. At the same time, while the use of only the optical fiber (without an OFT) with a laser polished output facet raises the laser-damage threshold to allow for some testing without damage, but such optical fibers suffer from some edge rounding (typically with a 25 micron radius minimum when the $CO_2$ laser was used for finishing the output distal facet) even when the most of the facet's area was substantially perfectly flat. The result is the "thin film feather" like formation at the very edge of the fiber facet (along the perimeter of the output facet of the fiber, where the later deposited "flyer" material would separate under the laser pulse) separates so different portions the disc of the film of such "flyer" material does not separate all at the same time, which understandably impedes the use of the optical fiber by itself in an optical detonator: the secondary explosive does not go off or, when it does, the initiation is asymmetrical.

Simply sleeved and machined for centricity optical fiber could be operationally acceptable if the facet of the sleeved fiber component were perfectly flat-so that the deposition of the "flyer" material (aluminum, for example) does not suffer variations because of a step up or step down between the sleeved fiber and the outer zirconia ferrule. The presence of substantially any spatial junction at all was demonstrated to necessarily cause irregularities in the metal film deposition that may or may not be readily detectible prior to the embodiment of the embodiment in an optical detonator.

A process of fabrication of an embodiment of the invention may understandably be governed with a processor controlled by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to the processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The term "A and/or B" or a similar term means "A alone, B alone, or A and B together" and is defined to be interchangeable with the term "at least one of A and B."

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention claimed is:

1. An article of manufacture comprising:

an optical fiber element having a first outer diameter, and an optical fiber termination dimensioned as a substantially cylindrical tube of a first glass-based and/or ceramic material that has a second outer diameter and that contains voids, wherein said voids are distributed throughout a body of the substantially cylindrical tube along an internal substantially cylindrical surface having a third diameter that is smaller than the second outer diameter, and wherein an outer surface of the optical fiber element is a surface of a second glass-based material and, at a distal end thereof, is permanently and directly affixed to an inner surface of the optical fiber termination.

2. An article of manufacture according to claim 1, (2A) wherein the optical fiber element includes an optical fiber core and an optical fiber cladding, and wherein the optical fiber cladding has a first inner diameter, said first outer diameter, and said outer surface of the optical fiber element; and/or (2B) wherein the inner surface of the optical fiber termination has a second inner diameter and the third diameter is larger than the second inner diameter.

3. An article of manufacture according to claim 1, wherein the inner surface of the optical fiber termination is hermetically joined with the outer surface of the optical fiber element at the distal end along multiple circumferentially closed lines distributed along an axis of the optical fiber element.

4. An article of manufacture according to claim 1, wherein said voids do not contain the first glass-based and/or ceramic material of the optical fiber termination.

5. An article of manufacture according to claim 1, wherein the optical fiber termination includes a hollow with a substantially cylindrical inner surface that is substantially coaxial with the internal substantially cylindrical surface and that is not in contact with the outer surface of the optical fiber element.

6. An article of manufacture according to claim 5, wherein the optical fiber element includes a fiber buffer, and wherein a portion of the fiber buffer is inside said hollow.

7. An article of manufacture according to claim 1, wherein at least one of the voids is dimensioned to define a spiral pattern along a length of the optical termination or wherein said at least one of the voids defines a substantially cylindrical void or a void shaped as an O-ring.

8. An article of manufacture according to claim 1, wherein a distal facet of the optical fiber element and a distal facet of the optical fiber termination are disposed and polished in a plane to define a distal facet of the article of manufacture.

9. An article of manufacture according to claim 1, wherein a distal facet of the optical fiber element and a distal facet of the optical fiber termination aggregately define a substantially planar distal facet of the article of manufacture, and further comprising a coating of a pre-determined material deposited on the distal facet of the article of manufacture, wherein the first outer diameter and the second outer diameter are dimensioned such that said coating of the pre-determined material is necessarily substantially uniform across the distal facet of the optical fiber element.

10. An article of manufacture according to claim 9, wherein said coating of the pre-determined material includes metal.

11. An article of manufacture according to claim 9, further comprising: an endpiece including a housing having a volume, wherein said endpiece is configured to be axially aligned with the optical fiber termination such as to have the volume be separated from the distal facet of the optical fiber element by said coating of the pre-determined material.

12. An article of manufacture according to claim 11, wherein the volume has an explosive material confined therein, and wherein said article is configured as an optical detonator.

13. An article of manufacture according to claim 1, further comprising:

a source of laser light configured to be operably cooperated with a proximal end of the optical fiber element.

14. A method comprising:

fabricating the article of manufacture according to claim 1 by at least:

permanently joining a bare glass-based material outer surface of a distal end of an optical fiber element, said bare glass-based material outer surface having a fiber outer radius, said optical fiber element having an axis, with a first inner surface of a hollow of a first element of an optical fiber termination, said first element having a first length; and hermetically fusing, between a first plane and a second plane, a first outer surface of the first element of the optical termination with a second inner surface of a second element of the optical fiber termination such as to not have gas trapped between the first outer surface and the second inner surface, wherein the first plane and the second plane are separated from one another along the first length, and wherein the outer surface of the first element of the optical fiber termination is a surface of a material dimensioned as a cylindrical surface having that has a substantially constant first radius along the first length.

15. A method according to claim 14, wherein the first outer surface is the surface of a glass-based and/or ceramic material, and/or wherein the second element of the optical fiber termination is dimensioned as a tubular element having a hollow with a substantially constant second radius.

16. A method according to claim 14, further comprising:

dimensioning said first outer surface of the first element of the optical fiber termination as said cylindrical surface of the substantially constant first radius.

17. A method according to claim 16, wherein (17A) said dimensioning includes defining said first radius to be smaller than the second radius by no more than 10 microns and/or no more than 5 microns and/or no more than 2 microns and/or no more than 1 micron; and/or (17B) an axial separation between the first and second planes exceeds 2 mm and/or exceeds 5 mm and/or exceeds 10 mm.

18. A method according to claim 14, further comprising:

forming, in said first outer surface and between the first plane and the second plane, multiple grooves and/or notches having bottoms defined at at least one third radius that is smaller than the first radius.

19. A method according to claim 18, wherein:

(19A) at least one of said multiple grooves and/or notches substantially circumscribes the axis; and/or (19B) a groove and/or notch from said multiple grooves and/or notches is shaped as an annular ring; and/or (19C) said hermetically fusing includes fluidly isolating and sealing said multiple grooves and/or notches from an ambient medium surrounding the second element of the optical fiber termination.

20. A method according to claim 14, wherein said hermetically fusing includes repositioning a beam of laser light, interacting with at least one of the first outer surface and the second inner surface, along the axis.

21. A method according to claim 14, wherein said permanently joining is devoid of using a glue or adhesive and/or wherein said permanently joining includes fusing the bare glass-based material outer surface and the first inner surface substantially at every point of the first inner surface.

22. A method according to claim 14, wherein the second element of the optical fiber termination has a second length that exceeds the first length, and further comprising:

inserting the distal end of the optical fiber element with the first element of the optical fiber termination permanently adjoined thereto into a hollow of the second element such that at least a portion of a fiber buffer layer is positioned inside said hollow of the second element.

23. A method according to claim 14, further comprising:

forming a distal facet of the optical fiber termination in a single plane, wherein each of a substantially planar distal facet of the optical fiber element, a substantially planar annular facet of the first element, and a substantially planar annular facet of the second element is disposed in said single plane.

24. A method comprising:

permanently joining a bare glass-based material outer surface of a distal end of an optical fiber element, said bare glass-based material outer surface having a fiber outer radius, said fiber having an axis, with a first inner surface of a hollow of a first element of an optical fiber termination, said first element having a first length;

hermetically fusing, between a first plane and a second plane, a first outer surface of the first element of the optical termination with a second inner surface of a second element of the optical fiber termination such as to not have gas trapped between the first outer surface and the second inner surface;

propagating light from a proximal end of an optical fiber element towards a distal bare end thereof that has a first outer diameter and that carries an optical fiber termination thereon, wherein the optical fiber termination is dimensioned as a substantially cylindrical tube of a glass-based and/or ceramic material that has a second outer diameter and that contains cavities, wherein said cavities are distributed throughout a body of the tube along an internal substantially cylindrical surface having a third diameter that is smaller than the second outer diameter, and wherein an outer surface of the distal bare end is permanently and directly affixed to an inner surface of the optical fiber termination;

and transmitting the light through an output facet of the distal bare end.

* * * * *